United States Patent

Casada et al.

[11] Patent Number: 5,236,011
[45] Date of Patent: Aug. 17, 1993

[54] NONINVASIVE VALVE MONITOR USING CONSTANT MAGNETIC AND/OR DC ELECTROMAGNETIC FIELD

[75] Inventors: Donald A. Casada; Howard D. Haynes, both of Knoxville, Tenn.

[73] Assignee: Martin Marietta Energy Systems, Inc., Oak Ridge, Tenn.

[21] Appl. No.: 718,058

[22] Filed: Jun. 20, 1991

[51] Int. Cl.$^5$ .......................... F16K 37/00; G01B 7/14
[52] U.S. Cl. ................................... 137/554; 324/207.2
[58] Field of Search .................. 324/207.2; 137/554, 137/553; 340/686

[56] References Cited

U.S. PATENT DOCUMENTS

| | | | |
|---|---|---|---|
| 3,162,805 | 12/1964 | Robertson | 324/207.2 |
| 3,522,596 | 8/1970 | Fowler et al. | 137/554 |
| 3,602,254 | 8/1971 | Fawkes | 137/554 |
| 3,857,277 | 12/1974 | Moore | 137/554 |
| 3,859,619 | 1/1975 | Ishihara | 340/238 |
| 3,896,280 | 7/1975 | Blake | 200/81.9 M |
| 4,086,519 | 4/1978 | Persson | 324/207.2 |
| 4,397,180 | 8/1983 | Wolff | 73/119 A |
| 4,601,211 | 7/1986 | Whistler | 137/554 |
| 4,618,824 | 10/1986 | Magee et al. | 137/554 |
| 4,825,157 | 4/1989 | Mikan | 324/207.2 |
| 5,002,090 | 3/1991 | Ichikawa et al. | 137/554 |
| 5,008,841 | 9/1991 | McElroy | 137/553 |
| 5,086,273 | 2/1992 | Leon | 137/554 |

OTHER PUBLICATIONS (Liberty Attachment 1) Notebook entries from Liberty Technologies, pp. 97-99, 107-109.
(Liberty Attachment 2) Patent application without claims, "System for Determining Position of an Internal, Movable Conductive Element."
(Liberty Attachment 3) U.S. patent application with claims, "A Non-Invasive System and Method for Inspection of Valves," Liberty File: MCEL-1.

Primary Examiner—A. Michael Chambers
Attorney, Agent, or Firm—James M. Spicer; Harold W. Adams

[57] ABSTRACT

One or more sources of steady magnetic field are carefully located on the outside of a valve body. The constant magnetic field is transmitted into the valve body and valve internals. A magnetic field detector carefully located on the outside of the valve body detects the intensity of the magnetic field at its location. As the position of a valve internal part is changed, there is an alteration in the magnetic field in the valve, and a consequent change in the detected magnetic field. Changes in the detected signal provide an indication of the position and motion of the valve internals.

23 Claims, 5 Drawing Sheets

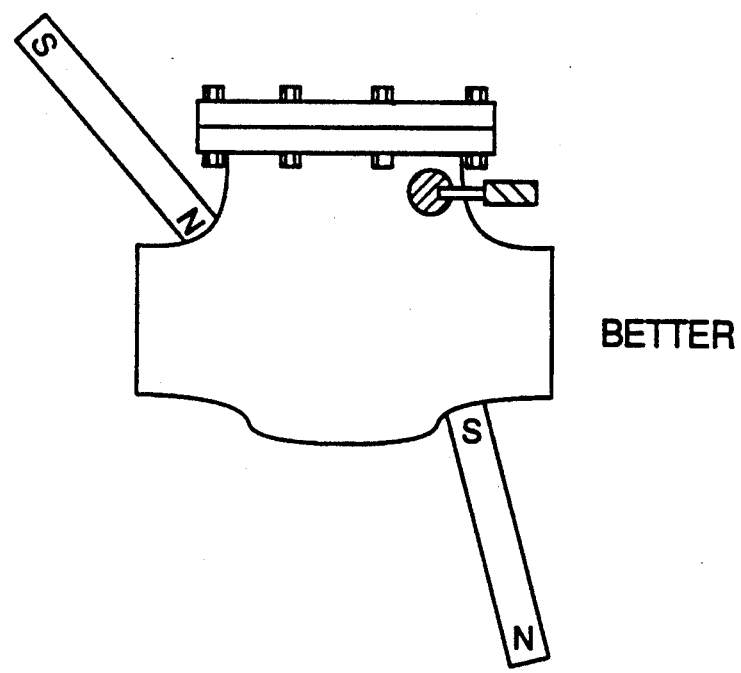
FIG. 4b  BETTER
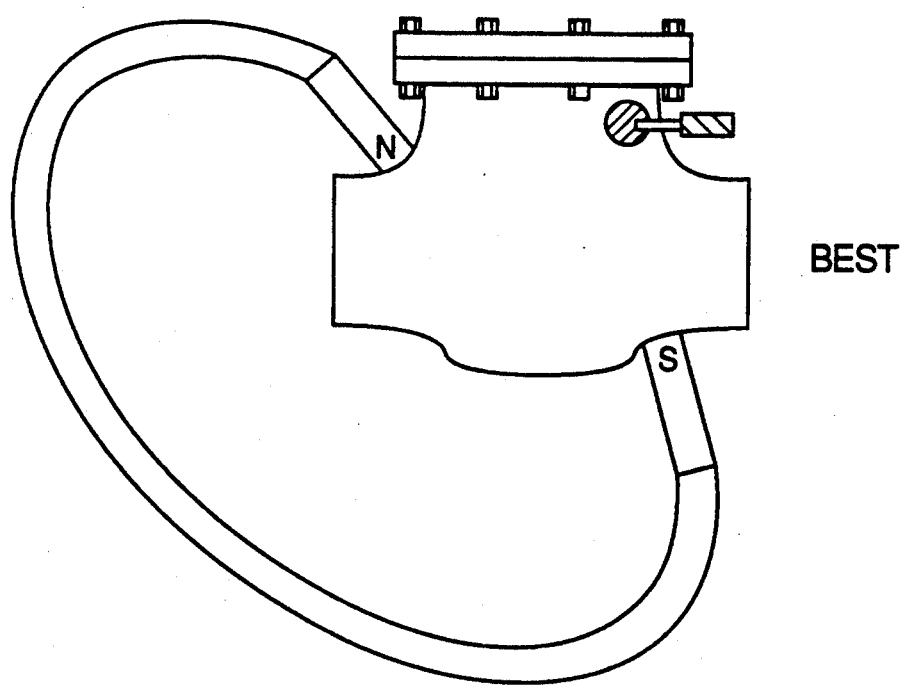
FIG. 4c  BEST

NONINVASIVE VALVE MONITOR USING CONSTANT MAGNETIC AND/OR DC ELECTROMAGNETIC FIELD

This invention was made with Government support under contract no. DE-AC05-84OR21400 awarded by the Department of Energy. The Government has certain rights in this invention.

Reference is made to related application entitled "Noninvasive Valve Monitor Using Alternating Electromagnetic Field", Ser. No. 07/718,453, filed Jun. 20, 1991, now U.S. Pat. No. 5,193,568, issued Mar. 16, 1993, commonly assigned, and filed on even date herewith.

BACKGROUND OF THE INVENTION

1. Field of the Invention

The invention relates to monitors for determination of the condition of operating valves, and more particularly to systems such as those which monitor external to the valve.

Check valves are used extensively within nuclear power plants for the purpose of controlling the direction of fluid flow. The function of a check valve is to permit flow in only one direction. When the flow stops or reverses direction, the check valve should close immediately in order to prevent backflow.

Check valve failures have led to water hammers, overpressurization of low-pressure systems, and damage to flow system components. Degradation and wear of check valve internal components have contributed substantially to the number and severity of check valve failures. Principal causes of internal component wear are vibrations and oscillations (instability) of check valve obturators under flow conditions that do not fully open the check valve. Obturator instability may be a result of misapplication (using oversized valves) and exacerbated by low flow conditions and/or upstream flow disturbances.

A recent Significant Operating Experience Report (SOER 86-03) distributed by the Institute of Nuclear Power Operations (INPO) recommends that nuclear power plants establish a preventive maintenance program to ensure check valve reliability. The program should include periodic testing, surveillance monitoring, and disassembly and inspection. A nuclear utility is thus motivated to determine which check valves are operating in an unstable or degraded condition.

Therefore a need exists for a method and device for positively determining the position and motion of a check valve obturator during plant operation. Those valves which are identified as unstable or degraded can then be disassembled more frequently which should reduce the number of failures which result from internal component wear.

Furthermore, those valves which are in satisfactory condition need not be disassembled. Avoidance of unnecessary disassembly minimizes costs, the potential for damaging the valve during disassembly or reassembly, improper reassembly, spread of radioactive contamination and radiation exposure to personnel, outage durations, and the potential for improper system restoration.

2. Description of the Prior Art

Several developmental and/or commercially available check valve monitors, particularly those based on measurements of acoustic emission, ultrasonics, radiography, and magnetic flux are described and discussed in a recent U.S. Nuclear Regulatory Commission report. The report, NUREG/CR-4302, Volume 2, also ORNL 193/V2 is available from National Technical Information Service, Springfield, Va. 22161, and is incorporated herein by reference.

SUMMARY OF THE INVENTION

In contrast to the prior art, the present invention is based on attaching one or more sources of constant magnetic field to the outside of a valve body at key locations. Strong permanent magnets or coils carrying dc current are used. The dc magnetic field(s) from the magnet(s) travels through the valve body and valve internals, and is detected externally at one or more key locations by a magnetic field sensor(s) such as a gaussmeter with Hall-effect probe. With a change in position of a valve internal part, there is a corresponding alteration in the magnetic field in the valve, and this change in magnetic field in the valve is detected by the gaussmeter to provide an indication of the motion of the valve internals.

BRIEF DESCRIPTION OF THE DRAWING

FIGS. 4a–4c are diagrams in explanation of a pole extender for use with the invention.

DETAILED DESCRIPTION OF THE INVENTION AND PREFERRED EMBODIMENTS

Figure 1:
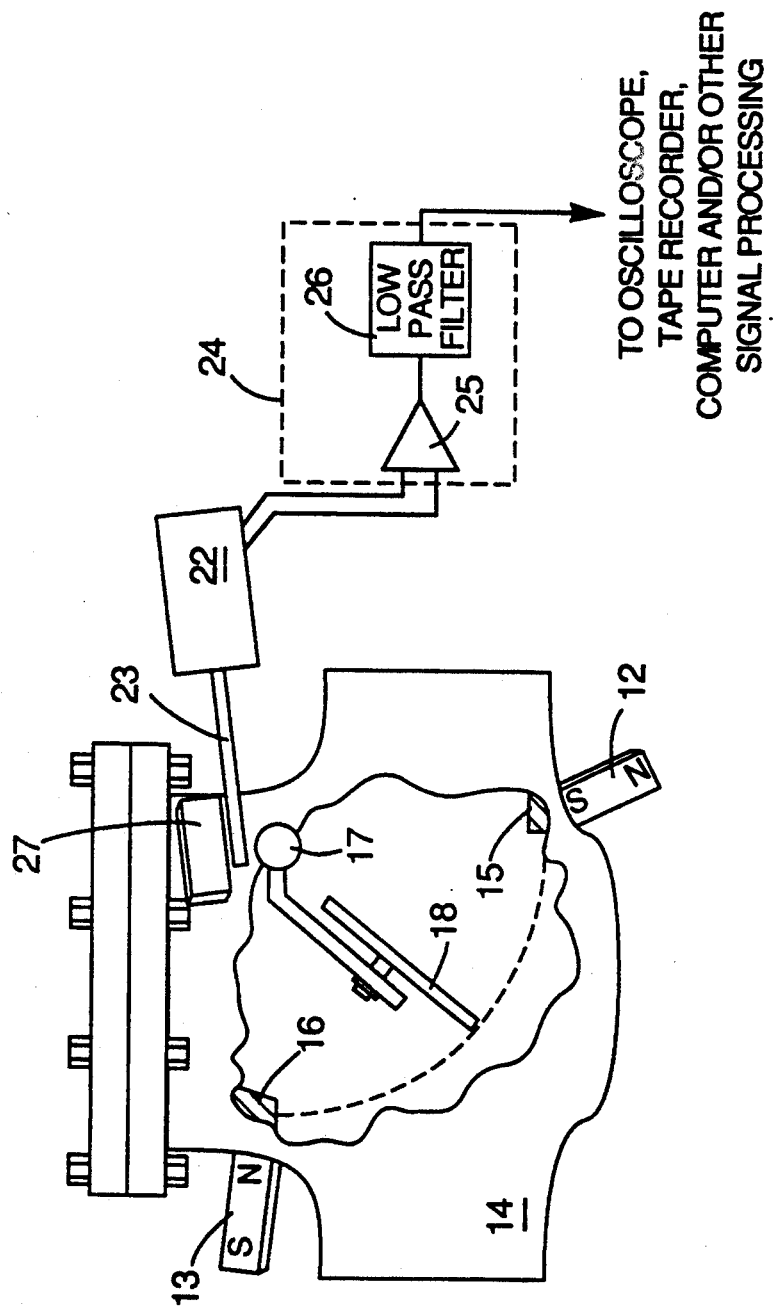
FIG. 1 is a cross-sectional, schematic view of a check valve embodying the magnetic field monitor of the present invention.

In FIG. 1, a preferred embodiment of the invention for carbon steel valves utilizes two permanent magnets 12 and 13 carefully located on the exterior of a check valve 14. One magnet is installed near the valve seat 15 and the other, of opposite polarity, near the backstop 16. A detector of steady and changing magnetic fields such as a gaussmeter 22 is installed with its probe tip 23 near one of the hinge pins 17 of the valve 14.

The magnets 12, 13 act as sources of strong dc magnetic fields applied externally to the check valve. These magnetic fields pass through the valve body and internals and are detected by the magnetic field detector 22. As long as no part of the valve is in motion, the gaussmeter 22 indicates an unchanging local magnetic field at the hinge pin 17. When an internal part such as the obturator or disc 18 moves, it alters the magnetic field in the valve. This change in magnetic field, i.e., change in the local magnetic flux density, is detected by the gaussmeter 22. The magnetic field changes picked up at the hinge pin by the gaussmeter are sufficient to use directly as an indication of the position of the obturator 18.

A ferromagnetic metal flux concentrator 27 positioned near the gaussmeter probe 23 substantially enhances the detected signal. In use, the gaussmeter probe 23 is located between the flux concentrator 27 and the part of the valve body of interest.

While permanent magnets have been mentioned in the description thus far, it will be understood that strong dc electromagnets may be substituted throughout the invention whereever permanent magnets are named.

To the basic invention described above, various signal conditioning electronics 24 can be added. For example, instead of just observing the gaussmeter 22 output, the gaussmeter output voltage can be amplified in amplifier 25 and filtered by the low-pass filter 26. By such means, a signal is available for immediate display on an oscilloscope, inputting to a tape recorder, further processing by digital computer means, and/or recording for subsequent viewing and analysis. Other signal processing means may be applied to the output from the signal conditioning electronics 24.

The low-pass filter 26 removes high frequency ambient magnetic noise such as from 60 Hz power sources. In addition to the higher frequency ambient noise, there may also be present low frequency electromagnetic noise (motor slip) from motor driven equipment. This low frequency noise is typically less than 1 Hz, and would not be removed by the analog low-pass filter. The low frequency slip component can be removed digitally, as in a digital computer, in one of three ways: 1) By determining the exact frequency of the slip frequency, and then developing a running average of the signal over the previous time period corresponding to one period of the slip noise; 2) By developing a curve fit for the slip frequency component of the signal and subtracting the curve fit from the overall signal; and 3) By digitally performing a transformation of the signal into the frequency domain, zeroing out the slip frequency component of the frequency domain signal, and then performing an inverse transformation back into the time domain.

The features of these are: method 1 is easily performed, but has the effect of suppressing information that is higher in frequency than the frequency to be suppressed; method 2 retains higher frequency information, but the slip frequency changes with changing loads, and thus a continuous curve fit based on a single sinusoidal frequency and magnitude is not feasible and instead, discrete curve fits are required; and, method 3 preserves the higher frequency components, and is relatively easily performed, e.g., a digital signal processor could be programmed to automatically remove the slip noise.

Strong magnetic fields are needed in the invention. These may be obtained from modern permanent magnets such as rare earth materials like neodymium-iron-boron or samarium cobalt that generate very strong magnetic fields. The invention contemplates the use of additional magnets placed at other locations on the valve body to build a connected field. That is, while one or two magnet locations may be suitable for many applications, additional magnets could be located at other key locations around the valve body to build or enhance a particular magnetic field arrangement, or in order to build a magnetic field connected in a particular way.

The magnets can be permanently affixed on the valve body by any suitable means or removed altogether. If removed, it is often desirable to provide index markings for subsequent relocation, or to leave holders and/or guides on the valve body.

The use of multiple gaussmeters may provide a better definition of obturator position at intermediate points of travel. This also allows digitization of the valve obturator position, giving a discrete indication of valve position in the event that the valve obturator does not go to the full open (or closed) position.

The invention is not limited to two magnetic field sources, nor to one magnetic field detector, nor to the particular placements shown in FIG. 1. Instead, optimal magnetic field and sensor arrangements will vary, depending upon the valve design and material. For stainless steel body/obturator valves, a single magnet, single gaussmeter arrangement has provided excellent results. For these valves, the magnet and gaussmeter can be placed on opposite sides of the valve body, with the disc moving in between. Placement of the gaussmeter at full open or full closed position provides a relatively linear signal.

Figure 2:
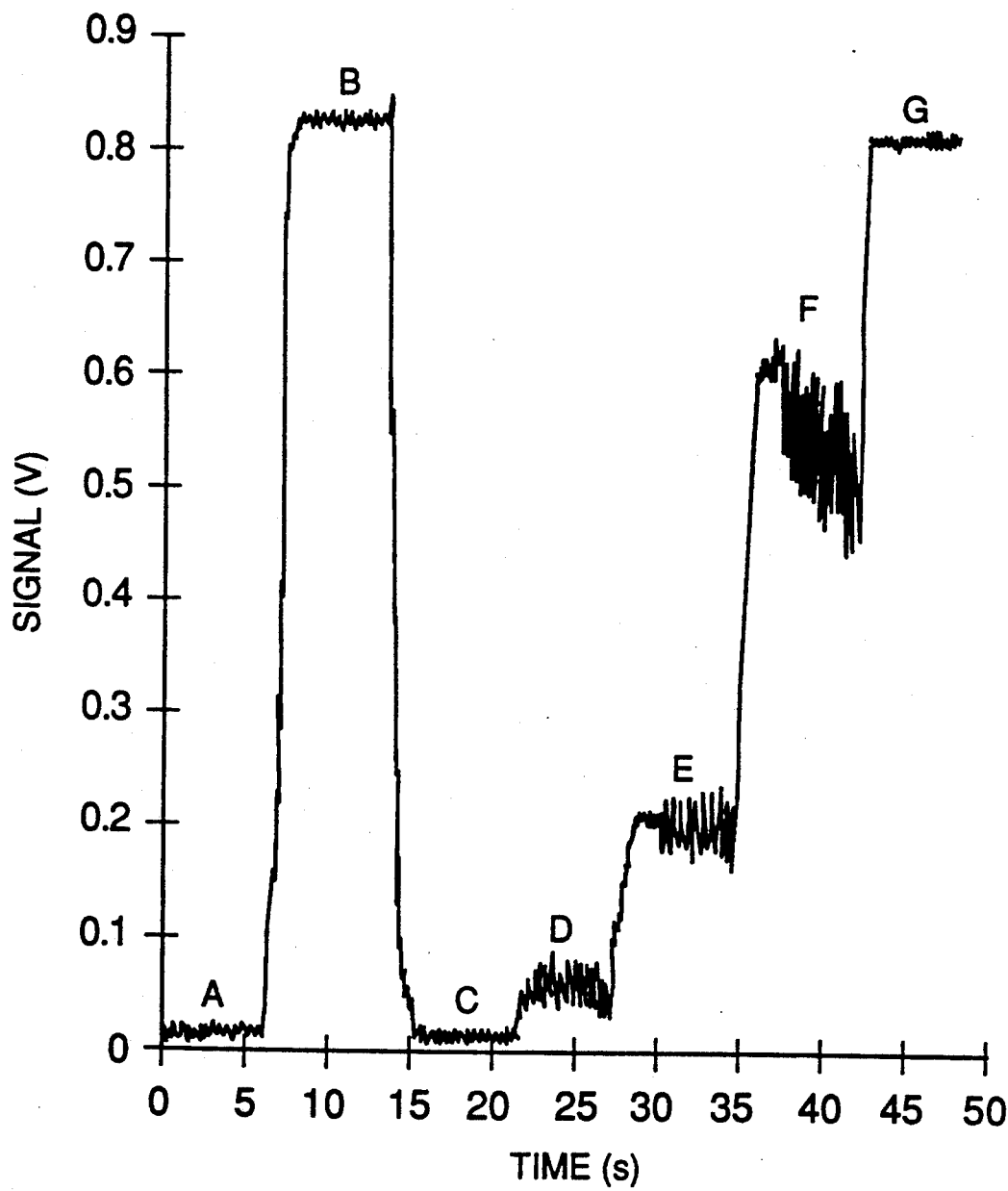
FIG. 2 is a trace of the invention monitoring a 10" carbon steel swing check valve manually actuated.

For carbon steel valves (and particularly larger valves), the multiple magnet arrangement depicted in FIG. 1 has been found to be the most effective, i.e., it produced the strongest signal change for obturator movement from the closed to open position. FIG. 2 illustrates a signal recorded for a single valve stroke of a 10" carbon steel swing check valve installed in a cooling water system. In the test of FIG. 2, the check valve disc assembly was manually moved from the fully closed to the fully open position.

Figure 3:
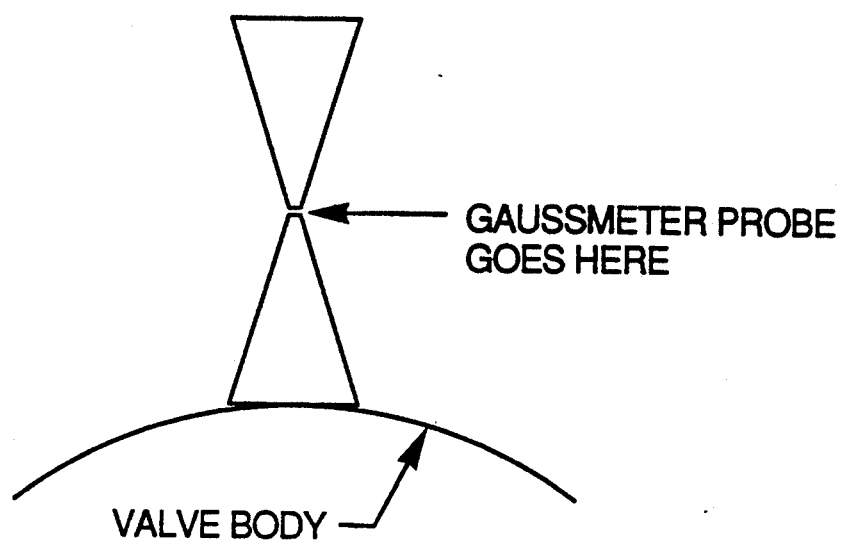
FIG. 3 is a diagram in explanation of an hourglass-shaped magnetic flux concentrator for use with the invention.

Increased signal levels and improved overall system performance result from installing the gaussmeter probe at pointed areas or protrusions on the valve, e.g., bonnet bolts. These provide good locations from which to measure the magnetic flux because the flux tends to be concentrated at such areas. If such a protrusion is not present at a desired sensor location on the valve, it may be added by installing a piece of carbon steel at the desired location. A conical flux concentrator having its base on the valve and its focal point proximate the magnetic field sensor is of particular advantage for this purpose. It was also found that machined mounts in an hourglass shape also created a flux concentration at the central neck that allowed good signals without having to use protrusions from the valve. An illustration is provided in FIG. 3.

Figure 4A:
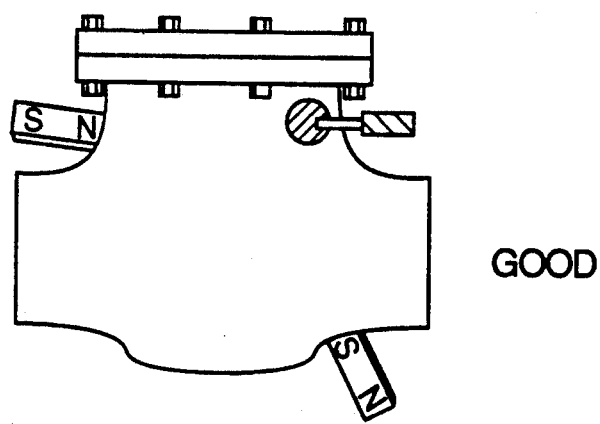

In FIG. 4a, the magnets used in this invention are typically oriented so that one magnetic "pole" touches or faces towards the valve body, and the opposite pole faces away from the valve body. In FIG. 4b, a significant improvement in the performance results when longer magnets are used, or when ferromagnetic bars extend the opposite pole away from the valve. This is believed to reduce the "short circuiting" of the magnetic field at the valve body, thus making more efficient use of the field produced by the magnets. In FIG. 4c, the signal strength of two magnets with opposite poles at different locations on the valve can be maximized by closing the external magnetic loop, or path. The two magnets become, in effect, one large horseshoe magnet. If two individual magnets are used, they may be magnetically connected together by a carbon steel cable, for example. Alternatively, a single, properly shaped horseshoe magnet may be used.

In experimentation, a typical gaussmeter signal may be found to be nonlinear with respect to the obturator movement. For example, the bulk of the signal change may occur when the disc is approaching its full open or full closed position, etc. There are situations where such nonlinear signals are actually preferred. However, by varying the magnet positions, and using the techniques described herein, a gaussmeter signal linear with respect to the obturator movement can usually be obtained if desired.

When carbon steel valves are exposed to magnetic field(s), the valve body will retain a level of residual magnetism for a time when the magnetizing force is removed. If the level of magnetization is sufficiently strong, disc movement in the presence of only the residual magnetic field causes a change in the local magnetic field which can be observed by the gaussmeter. The signal achieved by this method is of a lesser magnitude than from applied fields, but can be used to advantage in the invention in the production of humpback-shaped curves as shown in FIG. 5.

Figure 5:
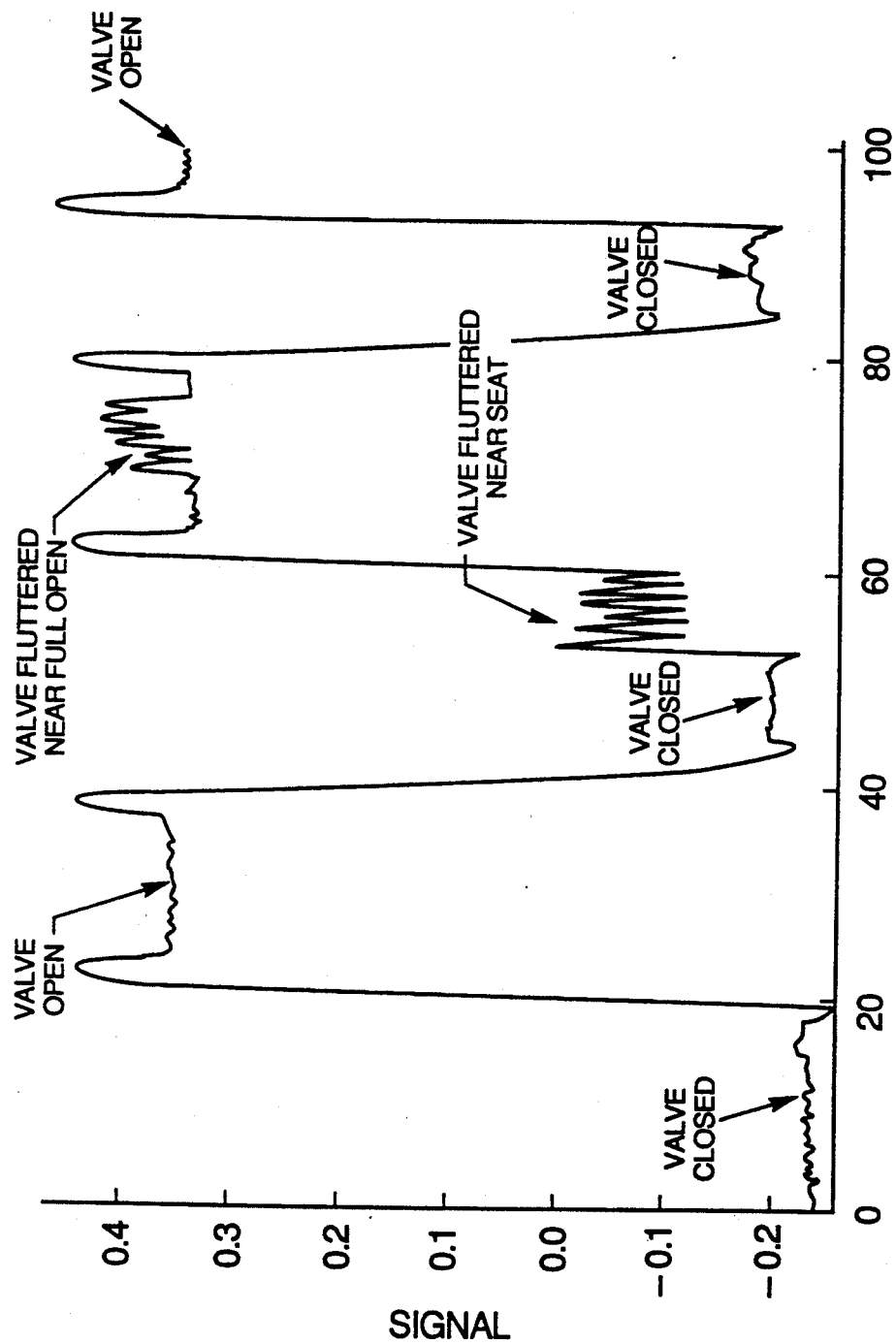
FIG. 5 is a trace of the invention monitoring a check valve, in particular illustrating the production of "humpback" shaped traces from magnets selectively placed on the valve body.

In FIG. 5, a first method for producing a humpback signal is to initially locate opposite-pole magnets at the obturator close and open positions. Remove them and switch the pole of one of the magnets. Thus, what was formerly a south pole attached, say, at the close position, is now a north pole attached to the close position. Where there was formerly a north pole at the open position, there is no magnet at all, but some residual field remains.

An alternative method for producing a humpback signal uses three source magnets. A south is placed at the full close position, a strong north near but not quite at the full open position, and a weaker south at the full open position. The gaussmeter output signal is linear with respect to obturator movement for most of its travel. However, when the obturator goes past the stronger of the two magnets near the full open position, the gaussmeter detects the strong local field, and as the obturator nears the full open position the gaussmeter detects the weaker of the two local magnetic fields, and begins to reverse the polarity sensed.

Other effects can be obtained by placing large and small magnets at the hinge pins, and variously switching the magnet locations. In this way, opposite polarity field concentrations of different magnitudes can be produced at the hinge pin region rather than at the open and close positions. The gaussmeter would be appropriately placed on the valve body, possibly at the backstop or seat. For some applications, placement of a single strong pole at the hinge pin area, and the gaussmeter at either the backstop or seat works well.

Thus, FIG. 5 illustrates the use of humpback response curves. The example of FIG. 5 illustrates that while the linear type signature of FIG. 2 may be more qualitatively interpreted than the humpback signature, it may also be interpreted incorrectly as a valve failing to fully open or close. The nonlinear humpback signature provides assurance that the disc has actually passed through the near-open and/or near-closed positions.

The invention described herein only requires the external attachment of one or more magnets and sensors. Holders or position indicating devices for both the magnetic sources and the signal pickup devices could be permanently located on the valve body. The setup time for applying the sources and sensors, and connecting the electronic signal processing equipment is but a matter of minutes. All equipment is external to the valve body, and requires neither an initial disassembly of the valve for installation, nor a periodic replacement of parts for each valve.

This method has been used to monitor many check valves having different sizes, body materials, and fluid media (air and water). It is particularly directed at check valves with bodies and obturators made of magnetic metals. There have been successful demonstrations of the invention on both lightly magnetic valves (316 stainless steel) and strongly magnetic valves (carbon steel).

It could be applied to other valve designs or to other devices where it is desired to monitor the position or motion of an internal part nonintrusively. For example, the invention has possible use as a position or motion monitoring device for nuclear power plant check valves, gate valves, globe valves, and other equipment with moving internal parts.

The system has been demonstrated successfully on stop check, swing check, lift check, and tilting disc check valves, as well as gate valves and globe valves of both carbon and stainless steel materials.

The invention has improved the abilities of nuclear plant maintenance personnel to determine check valve operational status and condition so that disassembly and inspection can be kept to a minimum.

While there has been shown and described what are at present considered the preferred embodiments of the invention, it will be obvious to those skilled in the art that various changes and modifications can be made therein without departing from the scope of the invention defined by the appended claims.

We claim:

1. A monitor for detecting movement of a valve element movably mounted in a valve housing, comprising:
    at least one source of constant magnetic field fixedly disposed externally of said valve housing in proximity to said valve element, said magnetic field of said source being transmitted into said valve housing and into a path of movement of the valve element; and
    a magnetic field detector fixedly disposed externally of said valve housing, said detector being positioned to be within the influence of said magnetic field, said detector producing an output signal which varies in accordance with positional variations of the valve element due to movement of said valve element within said magnetic field,
    wherein the valve element is at least partially composed of magnetic material.

2. The monitor of claim 1 wherein said source of constant magnetic field is a permanent magnet.

3. The monitor of claim 1 wherein said source of constant magnetic field is a dc electromagnet.

4. The monitor of claim 1 wherein said magnetic field detector is a gaussmeter with Hall-effect probe, said probe being within the influence of said magnetic field.

5. The monitor of claim 4 further including a magnetic metal flux concentrator positioned adjacent said probe whereby said output signal is enhanced due to the presence of said flux concentrator.

6. The monitor of claim 1 further including signal conditioning means for further processing of said output signal to produce a conditioned signal.

7. The monitor of claim 6 wherein said signal conditioning means comprises an amplifier and low-pass filter.

8. The monitor of claim 7 further including digital electronic means for low frequency slip component removal whereby the exact frequency of the slip frequency is determined, and a running average of said conditioned signal over the previous time period corresponding to one period of the slip noise is developed.

9. The monitor of claim 7 further including digital electronic means for low frequency slip component removal whereby a curve fit for the slip frequency component of said conditioned signal is developed, and subtracted from said conditioned signal.

10. The monitor of claim 7 further including digital electronic means for low frequency slip component removal whereby said conditioned signal is transformed into the frequency domain, the slip frequency component zeroed out, and the inverse transformation back into the time domain is performed.

11. The monitor of claim 1 wherein said source of constant magnetic field comprises a plurality of permanent magnets located around the valve body whereby a particular magnetic field arrangement is achieved.

12. The monitor of claim 1 wherein said magnetic field detector comprises a plurality of gaussmeters with Hall-effect probes, said probes being within the influence of said magnetic field in said valve.

13. The monitor of claim 1 wherein said source of constant magnetic field comprises a magnetic placed on one said of said valve housing, and said magnetic field detector is a gaussmeter placed on the opposite side of said valve housing with the valve element between said source and detector.

14. The monitor of claim 13 wherein said gaussmeter is placed at full open or full closed position so that said output signal is relatively linear.

15. The monitor of claim 1 wherein said valve includes a disc attached to a hinge pin, said disc moveable between a backstop and a seat, and wherein said source of constant magnetic field comprises a first magnet installed near said seat of said valve and a second magnet of opposite polarity installed near said backstop of said valve, and wherein said magnetic field detector is a gaussmeter installed with its probe tip near said hinge pins of said valve.

16. The monitor of claim 1 further comprising a conical flux concentrator having its base on said valve, and said magnetic field sensor located at the focal point of said concentrator.

17. The monitor of claim 1 further comprising an hourglass-shaped flux concentrator having one base on said valve, and said magnetic field sensor located at the neck of said hourglass concentrator.

18. The monitor of claim 1 wherein said source of constant magnetic field has first and second opposing magnetic poles, said first pole facing said valve, and said second pole having a ferromagnetic bar attached thereto for extending said second pole away from said valve.

19. The monitor of claim 1 wherein said source of constant magnetic field comprises two magnets having opposite poles facing said valve, and wherein the non-facing poles of said two magnets are magnetically connected.

20. The monitor of claim 15 wherein said first and second magnets are removed, and the pole of one of said magnets is switched, whereby said output signal is caused to be a humpback signal due to residual magnetic fields in said valve.

21. The monitor of claim 1 wherein said source of constant magnetic field comprises three magnets having poles of first and second polarity, said first polarity pole of said first magnet being placed at the full close position of said valve, said second polarity pole of said second magnet being placed near but not quite at the full open position of said valve, said second magnet being stronger in magnetic field strength than said third magnet, and said first polarity pole or said third magnet being placed at the full open position of said valve, and wherein said magnetic field detector is a gaussmeter installed with its probe tip near a support for said valve element, whereby said output signal is caused to be a humpback signal in accordance with positional variations of said valve element within said magnetic field.

22. The monitor of claim 1 wherein said valve includes a disc attached to a hinge pin, said disc moveable between a backstop and a seat, and wherein said source of constant magnetic field is a single strong magnet having one pole located at said hinge pin of said valve, and said magnetic field detector is a gaussmeter located at said backstop or said seat of said valve.

23. A monitor according to claim 1, wherein the magnetic material is selected from the group consisting of carbon steel and stainless steel.

* * * * *